(12) United States Patent
Okuyama et al.

(10) Patent No.: US 7,285,913 B2
(45) Date of Patent: Oct. 23, 2007

(54) PLASMA DISPLAY DEVICE HAVING BLUE PHOSPHOR LAYERS WITH ALKALINE EARTH METAL ALUMINATE CONTAINING MOLYBDENUM OR TUNGSTEN

(75) Inventors: Kojiro Okuyama, Ikoma (JP); Takehiro Zukawa, Katano (JP); Masahiro Sakai, Yawata (JP); Seigo Shiraishi, Neyagawa (JP); Kazuhiko Sugimoto, Kyoto (JP); Masaki Aoki, Mino (JP); Junichi Hibino, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 523 days.

(21) Appl. No.: 10/927,265

(22) Filed: Aug. 26, 2004

(65) Prior Publication Data

US 2005/0046330 A1   Mar. 3, 2005

(30) Foreign Application Priority Data

Aug. 29, 2003   (JP) ............................. 2003-307250
Apr. 26, 2004   (JP) ............................. 2004-130286

(51) Int. Cl.
*H01J 17/49*   (2006.01)

(52) U.S. Cl. ...................... 313/582; 313/587
(58) Field of Classification Search ......... 313/582–587
See application file for complete search history.

(56) References Cited

U.S. PATENT DOCUMENTS 5,376,303 A   12/1994   Royce et al.
5,851,428 A   12/1998   Matsuda et al.

(Continued)

FOREIGN PATENT DOCUMENTS

DE   195 21 119 A1   12/1995

(Continued)

OTHER PUBLICATIONS

Naoto Kijima, "Crystal Structure and Degradation Mechanism of Blue Phosphor", Display and Imaging, 1999. vol. 7, pp. 225 to 234.

(Continued)

*Primary Examiner*—Joseph Williams
*Assistant Examiner*—Bumsuk Won
(74) *Attorney, Agent, or Firm*—Hamre, Schumann, Mueller & Larson, P.C.

(57) ABSTRACT

A plasma display device is provided in which deterioration in brightness of phosphor layers can be avoided. The plasma display device includes a plasma display panel in which a plurality of discharge cells in one color or in a plurality of colors are arranged and phosphor layers are arranged so as to correspond to the discharge cells in colors and in which light is emitted by exciting the phosphor layers with ultraviolet rays. The phosphor layers include blue phosphor, the blue phosphor being composed of an alkaline-earth metal aluminate phosphor containing at least one element selected from the group consisting of Mo and W. The addition of hexavalent ions (Mo, W) in the blue phosphor allows the elimination of oxygen defects in the vicinity of a layer containing Ba atoms (Ba—O layer), the suppression of adsorption of water to the surface of the blue phosphor and the improvement of deterioration in brightness and a change in chromaticity for the respective phosphors and discharge characteristics.

19 Claims, 5 Drawing Sheets

U.S. PATENT DOCUMENTS

| | | |
|---|---|---|
| 6,169,357 B1 * | 1/2001 | Potter .................... 313/495 |
| 6,617,788 B2 | 9/2003 | Shiiki et al. |
| 6,660,186 B2 | 12/2003 | Ravilisetty |
| 2003/0107318 A1 | 6/2003 | Aoki et al. |

FOREIGN PATENT DOCUMENTS

| JP | 2000-178552 | 6/2000 |
|---|---|---|
| JP | 2000-251701 | 9/2000 |
| JP | 2001-55567 | 2/2001 |
| JP | 2003-36061 | 11/2003 |
| WO | 00/71637 A1 | 11/2000 |

OTHER PUBLICATIONS

Hajime Yamamoto, "Phosphors for Next-generation Display Devices", Japan Applied Physics, vol. 70, No. 3, 2001, p. 310 (with the partial English translation).

M. Shiiki et al., "Thermal Degradation of PDP phosphors", Technical Report of the Institute of Electronics, Information and Communication Engineers, EID 99-94, Jan. 27, 2000.

* cited by examiner

PLASMA DISPLAY DEVICE HAVING BLUE PHOSPHOR LAYERS WITH ALKALINE EARTH METAL ALUMINATE CONTAINING MOLYBDENUM OR TUNGSTEN

FIELD OF THE INVENTION

The present invention relates to a plasma display device that is used for TVs and the like to display an image.

BACKGROUND OF THE INVENTION

In recent years, in the field of color display devices used for computers and TVs to display images, a display device employing a plasma display panel (hereinafter also referred to as PDP) has received attention because such a device enables a large size, low profile and light-weight color display device. A plasma display device utilizing a PDP performs full color displaying by conducting additive color mixture of so-called three primary colors (red, green and blue). In order to perform such full color displaying, a plasma display device is provided with phosphor layers that emit light in respective colors including red (R), green (G) and blue (B) as the three primary colors, and phosphor particles making up these phosphor layers are excited by ultraviolet rays generated in a discharge cell of a PDP so as to generate the respective colors of visible light.

As compounds used for phosphors in the respective colors, $(YGd)BO_3:Eu^{3+}$ and $Y_2O_3:Eu^{3+}$ that emit red, $Zn_2SiO_4:Mn^{2+}$ that emits green and $BaMgAl_{10}O_{17}:Eu^{2+}$ that emits blue are known, for example. These phosphors are manufactured by mixing of prescribed raw materials, followed by baking at high temperatures of 1,000° C. or higher so as to initiate a solid phase reaction (See Phosphors Handbook, pages 219 and 225, published by Ohmsha, for example). These phosphor particles obtained by baking are ground and screened out (the average particle diameter of red and green: 2 μm to 5 μm and the average particle diameter of blue: 3 μm to 10 μm) for the use.

The reasons for grinding and screening out (classifying) the phosphor particles are as follows: when a phosphor layer is formed on a PDP, a general technique adopted is to screen-print pastes of phosphor particles in respective colors. When applying the pastes, phosphors with smaller and more uniform particle diameters (i.e., more uniform particle size distribution) allow a better coated surface to be attained easily. That is, phosphors with smaller and more uniform particle diameters having a shape closer to a sphere enable a better coated surface; the enhancement of the filling density of phosphor particles in a phosphor layer; and an increase in light-emitting surface area of the particles. Furthermore, such phosphors can alleviate instability during address driving. Theoretically, it can be considered that this results from an increase in brightness of a plasma display device.

However, when the particle diameters of the phosphor particles are decreased, the surface area of the phosphors would increase or defects on the surface of the phosphors would increase. Therefore, the surface of the phosphors tends to attract a large amount of water, carbonic acid gas or hydrocarbon based organic substances. Especially, in the case of a blue phosphor made of $Ba_{1-x}MgAl_{10}O_{17}:Eu_x$ or $Ba_{1-x-y}Sr_yMgAl_{10}O_{17}:Eu_x$ (where $0.03 \leq X \leq 0.20$, $0.1 \leq Y \leq 0.5$) that is an alkaline-earth metal aluminate phosphor containing divalent europium (Eu) as an activator, its crystal structure has a layer structure (See Display and Imaging, 1999. Vol. 7, pp 225 to 234, for example), and oxygen (O) in the vicinity of a layer containing Ba atoms (Ba—O layer) among these layers has defects (See Applied Physics, vol. 70, No. 3, 2001, p310, for example).

For that reason, water present in the air selectively is adsorbed to the surface of the Ba—O layer of the phosphor. Therefore, a large amount of the water is ejected in a panel during the course of a panel manufacturing process, and problems occur, such as deterioration in brightness caused by the reaction with the phosphor and MgO during the discharge (particularly, deterioration in brightness of blue and green), a change in chromaticity of the panel (shift in color caused by the change in chromaticity and burn-in of a screen), a decrease in driving margin and an increase in discharge voltage. Furthermore, when vacuum ultraviolet light (VUV) of 147 nm is adsorbed to the oxygen defects, another problem occurs such that the defects further increase, which further increases deterioration in brightness of the phosphor. To cope with these problems, a method is proposed in which the entire surface of the phosphors is coated with $Al_2O_3$ crystals for the purpose of allowing the defects of the conventional Ba—O layer to recover (See JP 2001-55567 A, for example). However, the coating on the entire surface causes the absorption of ultraviolet rays, which results in a problem of a decrease in brightness of light emitted from the phosphors and a problem of a decrease in brightness due to ultraviolet rays.

SUMMARY OF THE INVENTION

Therefore, with the foregoing in mind, it is an object of the present invention to provide a plasma display device whose deterioration in brightness of phosphors and degree of a change in chromaticity are alleviated and whose discharge characteristics are improved and that has excellent initial characteristics.

A plasma display device according to the present invention includes a plasma display panel in which a plurality of discharge cells in one color or in a plurality of colors are arranged and phosphor layers are arranged so as to correspond to the discharge cells in colors and in which light is emitted by exciting the phosphor layers with ultraviolet rays. The phosphor layers include blue phosphor, the blue phosphor being composed of an alkaline-earth metal aluminate phosphor containing at least one element selected from the group consisting of Mo and W.

DETAILED DESCRIPTION OF THE INVENTION

First of all, the effects obtained from the elimination of oxygen defects in the vicinity of a Ba—O layer of a blue phosphor will be described below.

Phosphors used for PDPs or the like are manufactured by a solid reaction method, an aqueous solution reaction method and the like. In these methods, when a particle diameter decreases, defects become likely to occur. Especially, in the solid reaction method, the grinding of phosphors following the baking generates a lot of defects. Furthermore, it is known that ultraviolet rays having a wavelength of 147 nm, which are generated from the discharge for driving a panel, also cause the occurrence of defects in the phosphors (See Technical Report of the Institute of Electronics, Information and Communication Engineers, EID 99-94, Jan. 27, 2000, for example).

Especially, it is known that, as for $BaMgAl_{10}O_{17}$:Eu that is an alkaline-earth metal aluminate blue phosphor, the phosphor itself has oxygen defects, in particular in its Ba—O layer (See Applied Physics, vol. 70 No. 3, 2001, p310, for example).

Figure 6:
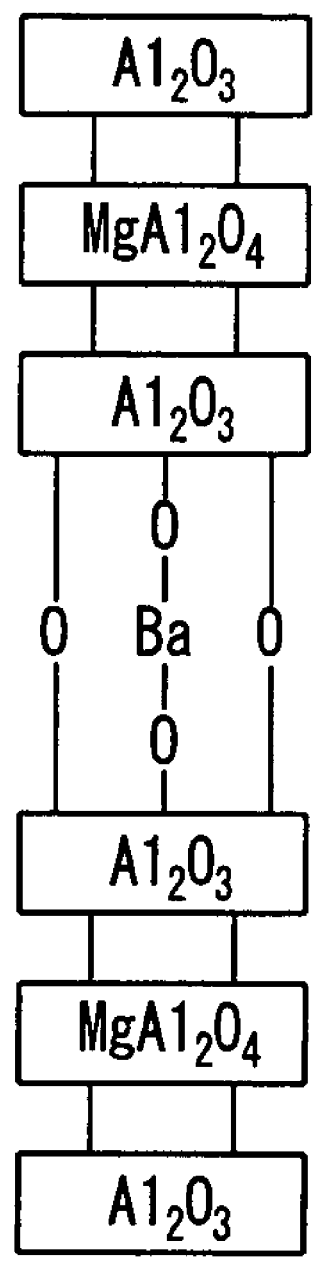
FIG. 6 schematically shows an atomic structure of the conventional blue phosphor.

FIG. 6 schematically shows a structure of the Ba—O layer of the $BaMgAl_{10}O_{17}$:Eu blue phosphor.

Regarding the conventional blue phosphor, it has been considered that the occurrence of these defects itself causes deterioration in brightness. In other words, it has been considered that the deterioration is caused by the defects caused by an impact on the phosphor by ions generated during the driving of a panel and the defects caused by ultraviolet rays having a wavelength of 147 nm.

The inventors of the present invention found that the deterioration in brightness is not caused only by the presence of such defects but the essential causes of the deterioration in brightness reside in that water and carbonic acid gas or hydrocarbon gas selectively are adsorbed to the oxygen (O) defects in the vicinity of a Ba—O layer and vacuum ultraviolet light (VUV) and ions are applied to the adsorbed state, thus resulting in a reaction of the phosphor with water so as to generate deterioration in brightness and shift in color. That is to say, the inventors of the present invention found that a large amount of water and carbonic acid gas or hydrocarbon gas are adsorbed to the oxygen defects in the vicinity of the Ba—O layer of the blue phosphor, and the adsorbed water and carbonic acid gas or hydrocarbon diffuse into the panel during the discharge, thus causing not only the deterioration in blue but also the deterioration in green.

From these findings, by decreasing the oxygen defects in the vicinity of the Ba—O layer of the blue phosphor, the amount of adsorption of the water and the carbonic acid gas or the hydrocarbon gas to the blue phosphor could be decreased significantly and deterioration in the brightness of blue and green during the manufacturing of a panel and during the driving of the panel could be avoided, whereby a plasma display device free from uneven color and burn-in of a screen and having a long life could be obtained. That is, in order to decrease the oxygen defects in the vicinity of the Ba—O layer, a part of aluminum (Al), magnesium (Mg) and barium (Ba) elements of the blue phosphor having a crystal structure of $Ba_{1-x}MgAl_{10}O_{17}$:$Eu_x$ or $Ba_{1-x-y}Sr_yMgAl_{10}O_{17}$:$Eu_x$ (where $0.03 \leq X \leq 0.20$, $0.1 \leq Y \leq 0.5$) is substituted with hexavalent ions or elements (Mo, W) or is arranged in the vicinity of these ions and elements. Thereby, the oxygen defects in the vicinity of the Ba—O layer could be decreased.

The following describes the effects of substituting positive ions in the $Ba_{1-x}MgAl_{10}O_{17}$ (where $0.03 \leq X \leq 0.20$) with the hexavalent ions or the elements (Mo, W) added thereto.

Al, Mg and Ba in the $Ba_{1-x}MgAl_{10}O_{17}$:$Eu_x$ (where $0.03 \leq X \leq 0.20$) as the blue phosphor are present as trivalent (Al) or divalent (Mg, Ba) plus ions. At a position of any one of these ions or in the vicinity of them, at least one element or ion selected from molybdenum (Mo) and tungsten (W), which are present mainly as hexavalent positive ions, are allowed to be located, whereby the positive electrical charge increases more in the crystals than from the addition of the conventional quadrivalent or quinquevalent ions. Conceivably, in order to neutralize such positive (+) electrical discharge (i.e., to compensate for the electrical charge), oxygen having negative electrical charge fills in an oxygen defect in the vicinity of a Ba element, which results in a decrease in oxygen defects in the vicinity of the Ba—O layer. That is, the hexavalent elements having a larger valence than those of trivalent to quinquevalent elements allow the compensation for oxygen defects with efficiency, because these elements have the capability of attracting a larger amount of oxygen. Among the hexavalent elements such as Cr, Se, Te, Mo, W and Re, it was found that the addition of W and Mo allows a larger effect to be attained.

As a method for manufacturing phosphors, a solid phase sintering method, a liquid phase method and a liquid spraying method are available. In the solid phase sintering method, conventional oxides and nitrate or carbonate materials and a flux are used. In the liquid phase method, an organic metal salt and nitrate are used, and these are hydrolyzed in an aqueous solution or are precipitated by adding an alkali or the like using a coprecipitation method so as to form a precursor of the phosphor, followed by a heat treatment applied thereto. In the liquid spraying method, an aqueous solution containing a raw material for phosphor is sprayed in a heated oven so as to manufacture the phosphor. According to any one of these methods, it was found that the effects can be obtained by adding hexavalent ions (Mo, W) and substituting a part of Al, Mg and Ba elements in $Ba_{1-x}MgAl_{10}O_{17}$:$Eu_x$ (where $0.03 \leq X \leq 0.20$) with the hexavalent ions.

According to the present invention, Mg, Al and Ba elements in crystals of blue phosphor that is an alkaline-earth metal aluminate phosphor are substituted with hexavalent elements (W, Mo) added thereto. Thereby, oxygen defects in the blue phosphor can be reduced, deterioration in brightness during the various steps for the phosphor layer can be avoided, and deterioration in brightness and change in chromaticity of the panel can be alleviated and discharge characteristics can be improved. As a result, a plasma display device that allows address errors of the panel to be avoided and enables a reduction in uneven color and shift in color and has excellent initial characteristics and high reliability can be realized.

Firstly, as one example of a method for manufacturing phosphor, a method using the solid reaction method for a blue phosphor will be described below. As raw materials, carbonates and oxides such as $BaCO_3$, $MgCO_3$, $Al_2O_3$, $Eu_2O_3$, $MO_3$ (where M denotes Mo and W) are used, to which a small amount of a flux ($AlF_3$, $BaCl_2$) is added as an accelerating agent for sintering, followed by baking at 1400° C. for 2 hours. Thereafter, the resultant is ground and screened out, and then is baked at 1500° C. for 2 hours in a reducing atmosphere ($H_2$ 25 vol %, $N_2$ 75 vol %). Then, the resultant is ground and screened out again so as to obtain the phosphor. Next, in order to further decrease the defects of the phosphor manufactured by the reducing procedure, the resultant is annealed in an oxidizing atmosphere at a temperature so as not to cause resintering of the phosphor, whereby the blue phosphor is obtained.

According to the liquid phase method in which phosphor is manufactured from an aqueous solution, an organic metal salt containing elements constituting the phosphor such as alkoxide and acetylacetone or nitrate is dissolved in water, and the resultant is hydrolyzed so as to manufacture a coprecipitate (hydrate). The coprecipitate (hydrate) undergoes hydrothermal synthesis (crystallization in an autoclave), is baked in the air or is sprayed in an oven at a high temperature so as to obtain powder. The thus obtained powder is baked at 1500° C. for 2 hours in a reducing atmosphere ($H_2$ 25 vol %, $N_2$ 75 vol %) so as to obtain a phosphor. The blue phosphor obtained by the above-stated method is ground and is screened out, and then is annealed in an oxidizing atmosphere at a temperature so as not to cause resintering of the phosphor, whereby the phosphor is obtained.

The amount of hexavalent ions (Mo, W), with which Al, Mg and Ba are substituted, preferably is within a range of 0.001 mol % to 3 mol %, inclusive, with reference to Al, Mg and Ba. In the case of the substitution amount less than 0.001 mol %, the effects for avoiding deterioration in brightness is small and in the case of the substitution amount more than 3 mol %, the brightness of the phosphor tends to decrease.

In this way, the conventional methods for manufacturing a blue phosphor powder are used, and Al, Mg and Ba ions in the $Ba_{1-x}MgAl_{10}O_{17}:Eu_x$ (where $0.03 \leq X \leq 0.20$) crystal are substituted with hexavalent ions or elements (Mo, W), whereby a phosphor resistant to water and vacuum ultraviolet light (VUV), which means to have a durability against water and carbonic acid gas generated during a phosphor baking process, a panel sealing process, a panel aging process or during the driving of a panel, can be obtained without a decrease in brightness of blue phosphors and green phosphors.

In this way, a plasma display device according to the present invention has a configuration including a PDP in which a plurality of discharge cells in one color or in a plurality of colors are arranged and phosphor layers are arranged so as to correspond to the discharge cells in color and in which light is emitted by exciting the phosphor layers with ultraviolet rays. In this PDP, a blue phosphor layer is composed of blue phosphors in which Al, Mg and Ba ions in $Ba_{1-x}MgAl_{10}O_{17}:Eu_x$ or $Ba_{1-x-y}Sr_yMgAl_{10}O_{17}:Eu_x$ (where $0.03 \leq X \leq 0.20$, $0.1 \leq Y \leq 0.5$) crystal having a uniform particle size distribution are substituted with hexavalent ions (Mo, W).

Then, the particle diameter of the blue phosphor particles, in which a part of Al or Mg ions in $Ba_{1-x}MgAl_{10}O_{17}:Eu_x$ or $Ba_{1-x-y}Sr_yMgAl_{10}O_{17}:Eu_x$ (where $0.03 \leq X \leq 0.20$, $0.1 \leq Y \leq 0.5$) is substituted with hexavalent ions (Mo, W), is as small as 0.05 μm to 3 μm and its particle size distribution is excellent. Furthermore, if the shape of the phosphor particles making up a phosphor layer is spherical, a filling density further is improved, which leads to a substantial increase in light-emitting area of the phosphor particles that contribute to the light-emission. As a result, the brightness of a plasma display device is enhanced, and at the same time deterioration in brightness and shift in color are suppressed, so that the plasma display with excellent brightness characteristics can be obtained.

The afore-mentioned blue phosphor particles include an alkaline-earth metal aluminate phosphor containing tungsten (W), and it is preferable that a concentration of tungsten (W) in the vicinity of a surface of the phosphor particles is higher than the average concentration of tungsten (W) in the phosphor particles as a whole.

In the present invention, preferably, the afore-mentioned alkaline-earth metal aluminate includes an alkaline-earth metal aluminate represented by the general formula of $xBaO \cdot (1-x)SrO \cdot zMgO \cdot 5Al_2O_3$ ($0.60 \leq x \leq 1.00$, $1.00 \leq z \leq 1.05$), and contains 0.40 to 1.70 mol % of Eu in terms of Eu and contains 0.04 to 0.80 mol % of W in terms of W.

Furthermore, it is preferable that the concentration of W in the vicinity of the surface of the phosphor particles ranges from 0.30 to 9.00 mol %.

Furthermore, it is preferable that the concentration of Eu in the vicinity of the surface of the phosphor particles is higher than the average concentration of Eu in the phosphor particles as a whole, and the divalent Eu ratio (the ratio of divalent Eu elements to all of the Eu elements) in the vicinity of the surface of the phosphor particles is lower than the average divalent Eu ratio in the phosphor particles as a whole.

Furthermore, it is preferable that the divalent Eu ratio in the vicinity of the surface of the phosphor particles ranges from 5 to 50 mol % and the average divalent Eu ratio in the phosphor particles as a whole ranges from 60 to 95 mol %.

Furthermore, it is preferable that the divalent Eu ratio in the vicinity of the surface of the phosphor particles ranges from 5 to 15 mol % and the average divalent Eu ratio in the phosphor particles as a whole ranges from 60 to 80 mol %.

The following describes a method for manufacturing a plasma display device of the present invention. This manufacturing method includes the steps of: an arrangement process in which pastes are arranged in discharge cells of a rear panel (rear substrate) described later, the pastes including phosphor particles for blue phosphor in which Al, Mg or Ba ions in $Ba_{1-x}MgAl_{10}O_{17}:Eu_x$ or $Ba_{1-x-y}Sr_yMgAl_{10}O_{17}:Eu_x$ (where $0.03 \leq X \leq 0.20$, $0.1 \leq Y \leq 0.5$) are substituted with hexavalent ions (Mo, W), red and green phosphor particles and a binder; a baking process for burning the binder included in the paste arranged on the rear panel to dissipate the same, and a process for overlaying the rear panel, on which phosphor particles are arranged on the substrate by the baking process, on a front panel described later.

Note here that a more preferable average particle diameter of the phosphor particles is within a range of 0.1 μm to 2.0 μm. Furthermore, as for a particle size distribution, it is more preferable that the maximum particle size is not more than four times the average value and the minimum value is not less than one-fourth of the average value. This is because a region where ultraviolet rays can reach in the phosphor particles is as shallow as several hundred nm from the surface of the particles, and only a portion near to the surface contributes to the light-emission. When the particle diameter of such phosphor particles is kept at 2.0 μm or less, a surface area of the particles contributing to the light-emission increases, so that the luminescent efficiency of the phosphor layer can be kept in a high state. When the particle diameter exceeds 3.0 μm, the phosphor layer is required to have a thickness of 20 μm or more, and therefore it becomes difficult to secure the sufficient discharge space. When the particle diameter is less than 0.05 μm, the defects become likely to occur, and it becomes difficult to enhance the brightness. When the thickness of the phosphor layer iswithin a range of eight to twenty-five times the average particle diameter of the phosphor particles, the discharge space can be secured sufficiently while keeping the luminescent efficiency of the phosphors layer in a high state, and therefore the brightness of the plasma display device can be increased.

Furthermore, in the phosphor of the present invention, it is preferable that the concentration of M (M denotes at least one element selected from Mo and W) in the vicinity of the surface of the phosphor particles is higher than the average concentration of M in the phosphor particles as a whole. With this phosphor, deterioration in light-emission intensity and change in chromaticity, caused by the irradiation with vacuum ultraviolet light and heat, can be reduced. More specifically, it is more preferable that the concentration of at least one type of element selected from Mo and W in the vicinity of the surface of the phosphor particles is twice or higher the average concentration in the phosphor particles as a whole, particularly preferably three times or higher.

It is preferable that the concentration of M in the vicinity of the surface of the particle diameters is higher than the average concentration of M in the phosphor particles as a whole, and that the content ratio to the alkaline-earth metal aluminate (preferably, the content ratio to the alkaline-earth metal aluminate represented by the afore-mentioned general formula) ranges from 0.30 to 9.00 mol %. Although the concentration of M in the vicinity of the surface of the phosphor particles should be higher than the average concentration of M in the phosphor particles as a whole, preferably, the former is higher than the latter by a range from 0.26 to 8.20 mol %.

Note here that for the purposes of the present invention, the vicinity of the surface of the phosphor particles means a region where the phosphor is excited by a short-wavelength light such as vacuum ultraviolet light so as to emit light, more specifically refers to the region of 50 nm from the surface of the phosphor particles. More preferably, this may refer to the average value of the region of 10 nm from the surface of the phosphor particles. Herein, since the depth of the excited light entering into the phosphor varies with the wavelength of the light, the above numerical example is not a limiting one.

In order to make the concentration of M in the vicinity of the surface of the phosphor particles higher than the average concentration of M in the phosphor particles as a whole, a preferable method is to control the atmosphere and the temperature of the baking step of the phosphor. More specifically, the baking step includes: a first step in which the mixed powder of raw materials of the phosphor or the powder baked in the air is baked in a reducing atmosphere; and a second step in which, at the fall in temperature of the first step or after that, a heat treatment is conducted in an inert atmosphere.

One example of a method for manufacturing such a phosphor will be described below.

As starting materials, $BaCO_3$, $SrCO_3$, $MgO$, $Al_2O_3$, $EuF_3$, $Nb_2O_5$, $Ta_2O_5$, $WO_3$ and $Ba_2O_3$ were used. They were weighed so as to have a predetermined composition, and were subjected to wet blending in pure water using a ball mill. After drying this mixture, this was subjected to reduction baking at 1200 to 1500° C. for 4 hours in a mixed gas of nitrogen and hydrogen corresponding to a reducing atmosphere (as one example, a mixed gas of 96 vol % of nitrogen and 4 vol % of hydrogen), and the temperature was allowed to fall from the baking temperature to 1000° C. in nitrogen corresponding to an inert atmosphere, and further was cooled down to a room temperature in a mixed gas of nitrogen and oxygen corresponding to an oxidizing atmosphere (as one example, a mixed gas of 98 vol % of nitrogen and 2 vol % of oxygen), thus obtaining phosphor. In this way, by changing the baking temperatures and the atmosphere during the step of the fall in temperature, the concentration distribution of M, the concentration distribution of Eu and the divalent Eu ratio in the phosphor particles were controlled.

The concentration of M (the surface M concentration), the concentration of Eu (the surface Eu concentration) and the divalent Eu ratio (the surface divalent Eu ratio) in the vicinity of the phosphor particles were measured by X-ray photoelectron spectroscopy (XPS). In the surface analysis by XPS, the average value of the elements residing at a region of 10 nm from the surface of the phosphor was measured. The average concentration of M (average M concentration), the average concentration of Eu (average Eu concentration) and the average divalent Eu ratio of the phosphor particles as a whole were measured by a fluorescent X-ray method.

Table 1 shows the composition ratio, the concentrations of the respective elements (the average M concentration, the average Eu concentration, the average divalent Eu ratio, the surface M concentration, the surface Eu concentration and the surface divalent Eu ratio) and the maintenance factor of the light-emission intensity of the samples Y/y after the irradiation with vacuum ultraviolet light having a wavelength of 146 nm for 100 hours (i.e., the ratio of the light-emission intensity after the irradiation to the initial light-emission intensity value) of the thus manufactured phosphors. Note here that Y and y denote the brightness Y and the chromaticity y that comply with the XYZ colorimetric system of the International Commission on Illumination, and the light-emission intensity Y/y represents a relative value. In Table 1, the sample to which a * mark is given is a comparative example.

X and z denote the values of x and z in the general formula of $xBaO \cdot (1-x)SrO \cdot zMgO \cdot 5Al_2O_3$.

TABLE 1

| | | | | Average composition | | | Surface composition | | | Y/y |
| | | | | M | Eu | divalent Eu | M | Eu | divalent Eu | Maintenance factor |
| Sample No. | x | z | M | (mol %) | (mol %) | (mol %) | (mol %) | (mol %) | (mol %) | (%) |
|---|---|---|---|---|---|---|---|---|---|---|
| *1 | 0.90 | 0.90 | none | 0 | 0.83 | 90 | 0 | 0.83 | 90 | 35 |
| *2 | 0.90 | 0.90 | Nb | 0.02 | 0.83 | 86 | 0.02 | 0.83 | 83 | 48 |
| 3 | 0.60 | 1.00 | W | 0.04 | 0.40 | 80 | 0.12 | 1.20 | 50 | 85 |
| 4 | 1.00 | 1.05 | W | 0.04 | 1.70 | 75 | 0.25 | 8.50 | 45 | 87 |
| 5 | 0.85 | 1.00 | W | 0.80 | 0.80 | 62 | 9.00 | 5.60 | 15 | 96 |
| 6 | 0.85 | 1.00 | W | 0.04 | 0.80 | 73 | 0.30 | 4.00 | 30 | 94 |
| 7 | 0.85 | 1.00 | W | 0.10 | 0.80 | 60 | 1.00 | 7.00 | 18 | 97 |

TABLE 1-continued

| | | | | Average composition | | | Surface composition | | | Y/y |
| | | | | M | Eu | divalent Eu | M | Eu | divalent Eu | Maintenance factor |
| Sample No. | x | z | M | (mol %) | (mol %) | (mol %) | (mol %) | (mol %) | (mol %) | (%) |
|---|---|---|---|---|---|---|---|---|---|---|
| 8 | 0.85 | 1.00 | $W_{1/2}Mo_{1/2}$ | 0.10 | 0.80 | 68 | 1.00 | 6.40 | 23 | 97 |
| 9 | 0.85 | 1.00 | W | 0.10 | 0.80 | 95 | 0.85 | 6.70 | 50 | 90 |
| 10 | 0.85 | 1.00 | W | 0.10 | 0.80 | 80 | 1.00 | 6.00 | 15 | 95 |
| 11 | 0.85 | 1.00 | W | 0.10 | 0.80 | 60 | 1.00 | 7.50 | 5 | 99 |
| 12 | 0.60 | 1.00 | Mo | 0.04 | 0.40 | 75 | 0.10 | 1.10 | 60 | 80 |
| 13 | 1.00 | 1.05 | Mo | 0.04 | 1.70 | 71 | 0.24 | 6.50 | 32 | 82 |
| 14 | 0.85 | 1.00 | Mo | 0.80 | 0.80 | 60 | 9.00 | 5.40 | 22 | 88 |
| 15 | 0.85 | 1.00 | Mo | 0.04 | 0.80 | 66 | 0.30 | 3.50 | 30 | 85 |
| 16 | 0.85 | 1.00 | Mo | 0.04 | 0.80 | 75 | 12.00 | 3.30 | 13 | 75 |

(Remark) *1, *2 represent comparative examples.

As is evident from Table 1, the phosphors according to the present invention are reduced in the deterioration in light-emission intensity caused by the irradiation with vacuum ultraviolet light. Furthermore, the samples whose surface M concentrations range from 0.30 to 9.00 mol % especially are reduced in the deterioration.

The samples 2 to 16 were kept in the air at 500° C. for 1 hour, and changes in light-emission intensity and chromaticity before and after the heat treatment were determined. As a result, both of the light-emission intensity and the chromaticity of sample 2 significantly changed, whereas the light-emission intensities and the chromaticities of samples 3 to 16 were much the same as those before the heat treatment. In particular, the light-emission intensities of the samples having the surface divalent Eu ratio of 5 to 50 mol % and having the average divalent Eu ratio of 60 to 95 mol % did not change at all, and moreover the samples having the surface divalent Eu ratio of 5 to 15 mol % and having the average divalent Eu ratio of 60 to 80 mol % did not change in their chromaticities at all also.

Furthermore, in the present invention, the following optimum combination of the phosphors allows a plasma display device free from a change in chromaticity (shift in color and burn-in) and deterioration in brightness to be attained.

As the optimum phosphor particles used for a blue phosphor layer, a compound represented by $Ba_{1-x}MgAl_{10}O_{17}:Eu_x$ or $Ba_{1-x-y}Sr_yMgAl_{10}O_{17}:Eu_x$ to which hexavalent ions or elements (Mo, W) are added may be used. Herein, it is preferable the value of x in the compound is $0.03 \leq X \leq 0.20$ and the value of y is $0.1 \leq Y \leq 0.5$, because high brightness can be realized.

As preferable phosphor particles used for a red phosphor layer, a compound represented by $Y_{2-x}O_3:Eu_x$ or $(Y, Gd)_{1-x}BO_3:Eu_x$ or a mixture of these may be used. Herein, it is preferable that the value of x in the compound for a red phosphor is $0.05 \leq X \leq 0.20$, because the excellent effects concerning brightness and against deterioration in brightness can be obtained.

As preferable phosphor particles used for a green phosphor layer, a compound represented by $Y_{1-x}BO_3:Tb_x$ or $Zn_{2-x}SiO_4:Mn_x$ or a mixture of these may be used. Herein, it is preferable that the value of x in the compound for a green phosphor is $0.01 \leq X \leq 0.10$, because the excellent effects concerning brightness and against deterioration in brightness can be obtained.

The following describes a plasma display device according to one embodiment of the present invention, with reference to the drawings.

Figure 1:
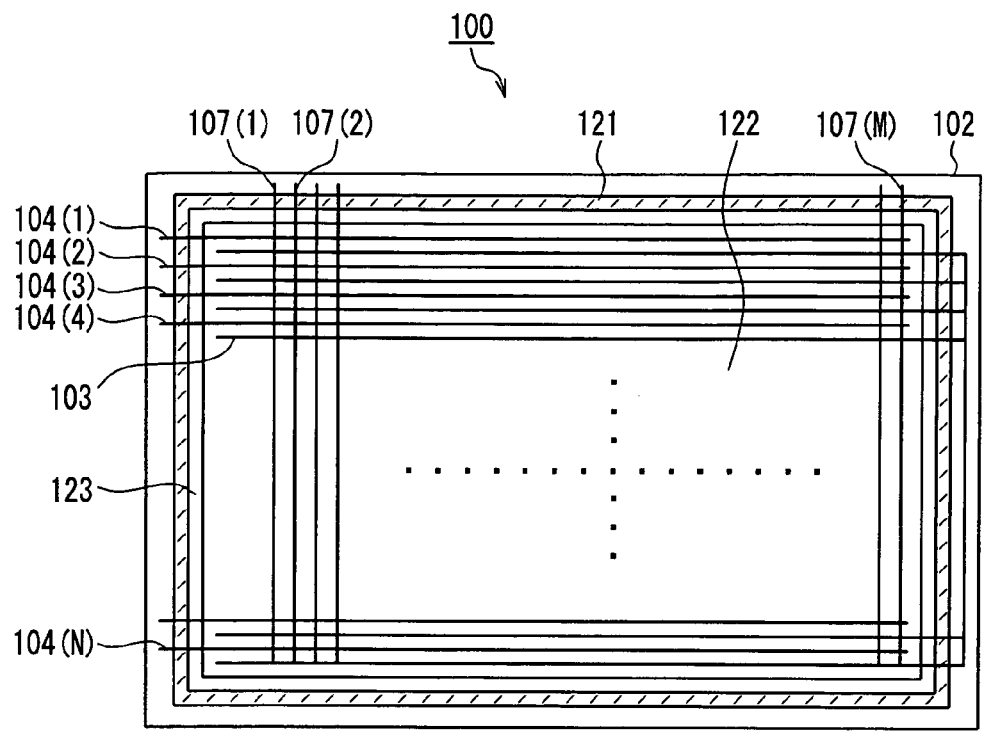
FIG. 1 is a plan view of a PDP of one embodiment of the present invention that shows a state where a front glass substrate has been removed.
Figure 2:
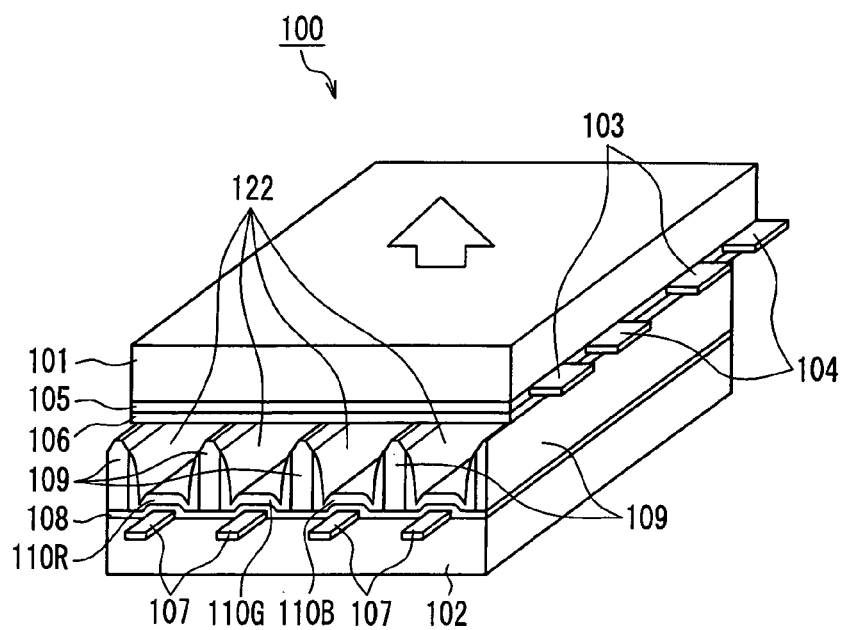
FIG. 2 is a perspective view showing a partial cross-section of an image display region of the PDP.

FIG. 1 is a schematic plan view of a PDP that shows a state where a front glass substrate has been removed, and FIG. 2 is a perspective view showing a partial cross-section of an image display region of the PDP. Note here that, in FIG. 1, a display electrode group, a display scanning electrode group and an address electrode group are illustrated by partially omitting the same for the sake of intelligibility. Referring now to FIG. 1 and FIG. 2, a structure of the PDP will be described below.

As shown in FIG. 1, a PDP 100 includes a front glass substrate (not illustrated), a rear glass substrate 102, N pieces of display electrodes 103, N pieces of display scanning electrodes 104 (the N-th electrode is provided with its number), M pieces of address electrodes group 107 (the M-th electrode is provided with its number), a hermetically sealing layer 121 and the like. The PDP 100 has a matrix of electrodes having a three-electrode structure made up of the respective electrodes 103, 104 and 107, and cells are formed at intersection points of the respective display scanning electrodes 104 and address electrodes 107. Reference numeral 122 denotes a discharge space and 123 denotes an image display region.

As shown in FIG. 2, this PDP 100 is configured by bonding the front panel with the rear panel and by fling the discharge space 122 formed between the front panel and the rear panel with a discharge gas, where the front panel includes the display electrode group 103, the display scanning electrode group 104, a dielectric glass layer 105 and a MgO protective layer 106 provided on one major surface of a front glass substrate 101. The rear panel includes the address electrodes 107, a dielectric glass layer 108, barrier ribs 109, a phosphor layer 110R (red phosphor), a phosphor layer 110G (green phosphor) and a phosphor layer 110B (blue phosphor) are provided on one major surface of a rear glass substrate 102. The arrow of FIG. 2 indicates a direction of displaying an image.

Figure 3:
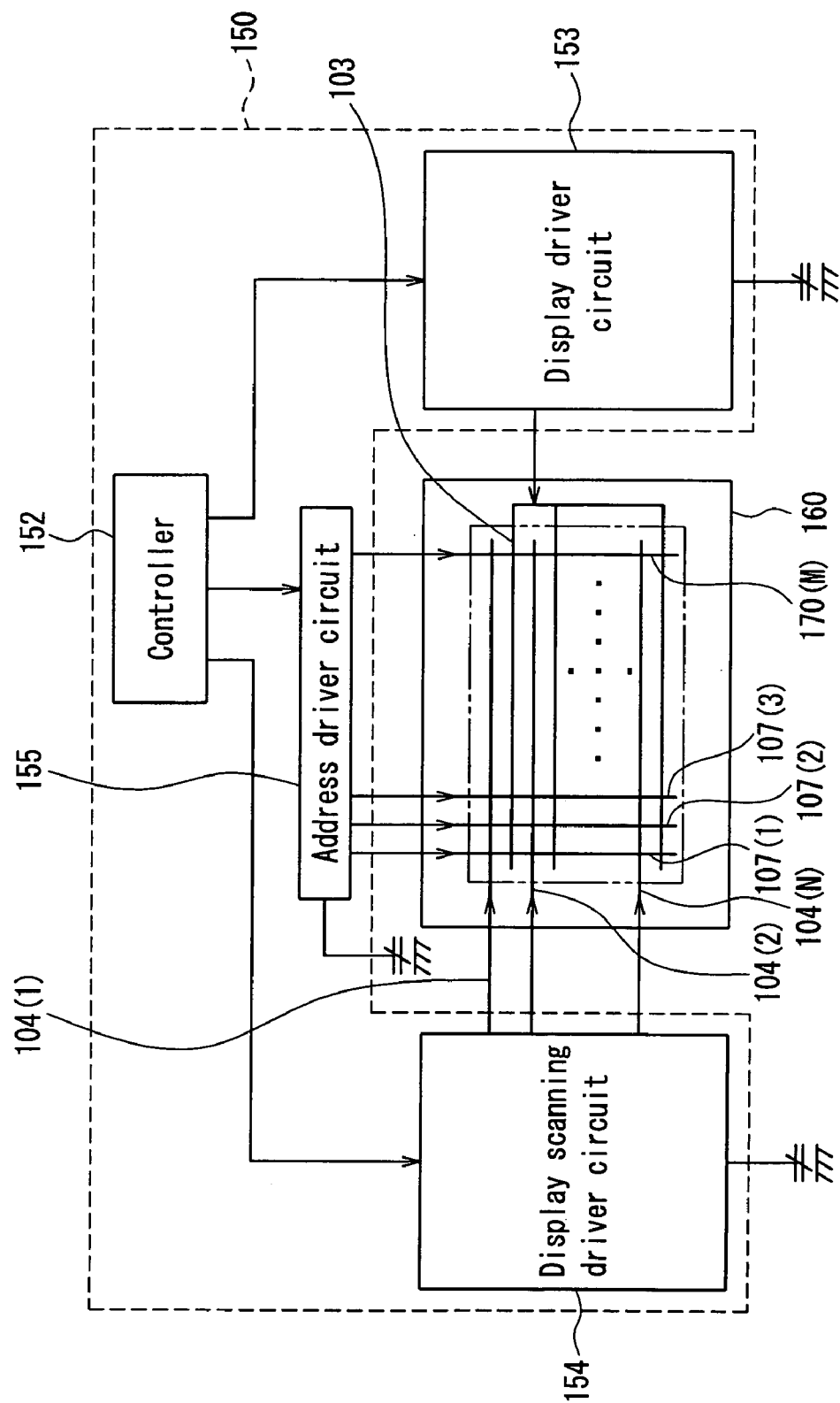
FIG. 3 is a circuit block diagram of a plasma display device of one embodiment of the present invention.

When the plasma display device is driven for displaying, as shown in FIG. 3, a display driver circuit 153, a display scanning driver circuit 154, an address driver circuit 155 are connected with the PDP. Then, in accordance with the control signal from a controller 152, a signal voltage is applied to a discharge cell to be illuminated by way of the display scanning electrode 104 and the address electrode 107, and address discharge is conducted within the discharge cell. Thereafter, a pulse voltage is applied between the display electrode 103 and the display scanning electrode 104 so as to conduct sustain discharge. This sustain discharge enables the generation of ultraviolet rays in the discharge cell, and the phosphor layer excited by the ultraviolet rays emits light, so that the discharge cell illuminates. The combination of illuminated and not-illuminated discharge cells in respective colors allows an image to be displayed.

Figure 4:
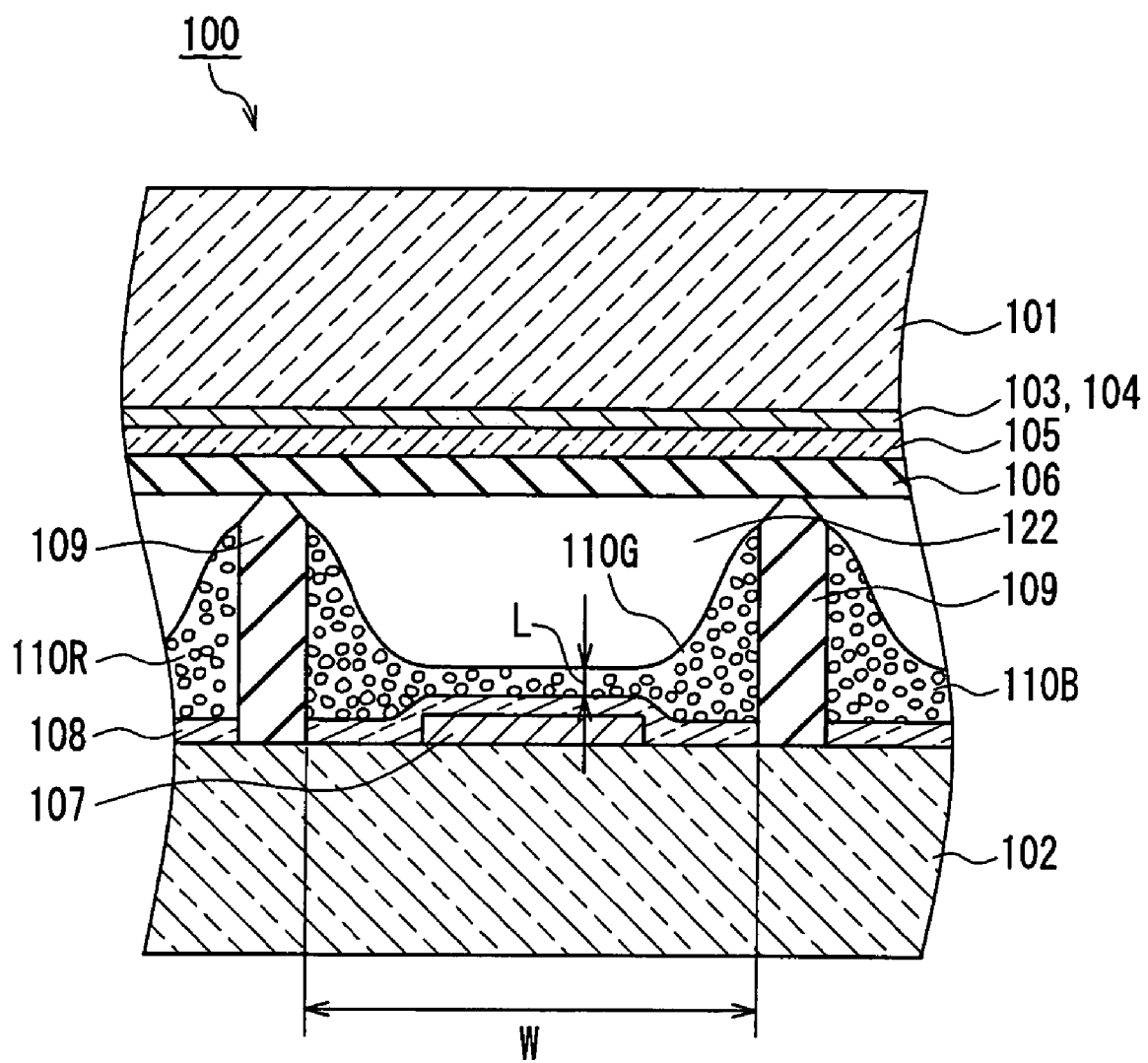
FIG. 4 is a cross-sectional view showing a structure of an image display region of a PDP of one embodiment of the present invention.
Figure 5:
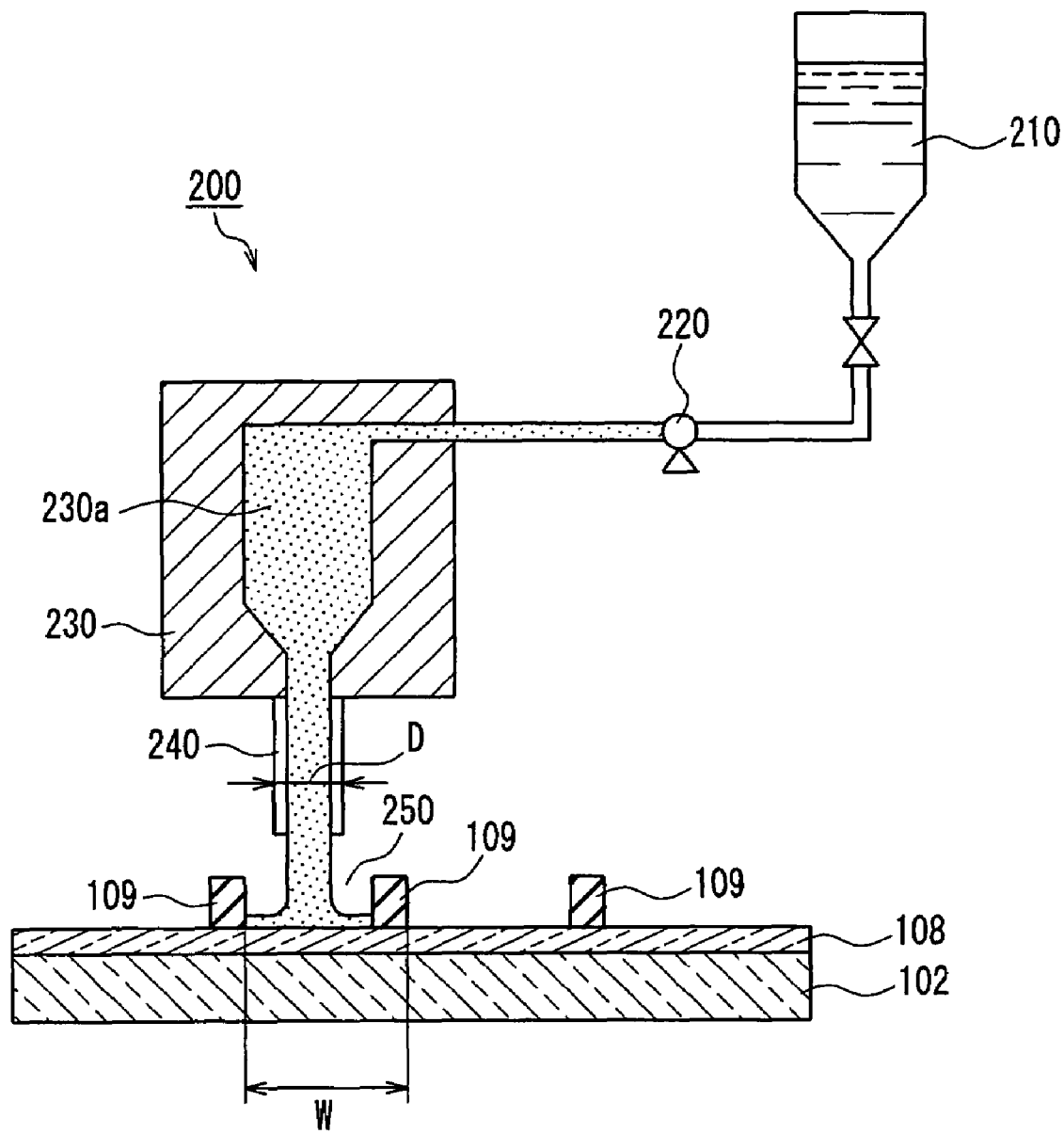
FIG. 5 schematically shows a configuration of an ink application apparatus in cross section that is used for forming the phosphor layers of the PDP.

The following describes a method for manufacturing the above-described PDP 100, with reference to FIG. 4 and FIG. 5.

The front panel is manufactured as follows: firstly, N pieces of display electrodes 103 and N pieces of display scanning electrodes 104 (although 2 pieces for each only are illustrated in FIG. 2) are formed alternately and in parallel with each other on the front glass substrate 101 so as to form stripes, and then this is coated with a dielectric glass layer 105, and on the surface of the dielectric glass layer 105, a MgO protective layer 106 further is formed.

The display electrodes 103 and the display scanning electrode 104 are electrodes made of silver, which are formed by applying a silver paste for electrodes by screen-printing, followed by baking.

The dielectric glass layer 105 is formed as follows: a paste containing a lead-based glass material is applied by screen-printing, followed by baking at a predetermined temperature for a predetermined time period (e.g., at 560° C. for 20 minutes), so as to have a predetermined thickness (about 20 μm). As the above paste containing a lead-based glass material, a mixture of PbO (70 wt %), $B_2O_3$ (15 wt %), $SiO_2$ (10 wt %) and $Al_2O_3$ (5 wt %) and an organic binder (10 wt % of ethylcellulose dissolved in α-terpineol) may be used, for example. Herein, the organic binder refers to a resin dissolved in an organic solvent, and acrylic resin may be used as the resin in addition to the ethylcellulose and butyl carbitol may be used as the organic solvent. Moreover, a dispersing agent (e.g., glycerol trioleate) may be mixed with such an organic binder.

The MgO protective layer 106 is made of magnesium oxide (MgO), which is formed by sputtering or CVD (chemical vapor deposition), for example, so as to have a predetermined thickness (about 0.5 μm).

The rear panel is formed as follows: firstly, a silver paste for electrodes is screen-printed on the rear glass substrate 102, followed by baking so that M pieces of address electrodes 107 are formed so as to be arranged in the column direction. A paste containing a lead-based glass material is applied thereon by screen-printing so as to form a dielectric glass layer 108, and similarly a paste containing a lead-based glass material is applied thereon by screen-printing repeatedly at predetermined intervals, followed by baking, so as to form the barrier ribs 109. The discharge space 122 is divided into each discharge cell (unit luminescent area) in the line direction by these barrier ribs 109.

FIG. 4 is a cross-sectional view showing a part of the PDP 100. As shown in FIG. 4, an interval dimension W between the barrier ribs 109 (a width of one discharge cell) is specified as about 130 μm to 240 μm. This is a general specification for HD-TVs (high definition TVs) of 32-inch to 50-inch in size. Phosphor inks in a paste form are applied in grooves between the rib walls 109. The phosphor inks include: the phosphor particles in respective colors for red (R), green (G) and blue (B) in which Al, Mg or Ba element ions in $Ba_{1-x}MgAl_{10}O_{17}$:$Eu_x$ or $Ba_{1-x-y}Sr_yMgAl_{10}O_{17}$:$Eu_x$ are substituted with hexavalent ions (Mo, W); and an organic binder. This is baked at a temperature of 400 to 590° C. so as to burn and dissipate the organic binder, whereby phosphor layers 110R, 110G and 110B are formed in which the respective phosphor particles are bound with each other.

The thickness L of these phosphor layers 110R, 110G and 110B in the lamination direction on the address electrodes 107 preferably is about eight to twenty-five times the average particle diameters of the phosphor particles in the respective colors. That is, in order to secure the brightness (luminescent efficiency) when these phosphor layers are irradiated with a certain intensity of ultraviolet rays, the phosphor layers need to have the capability of absorbing ultraviolet rays generated within the discharge space without letting the ultraviolet rays pass therethrough, and therefore the thickness corresponding to the lamination of eight layers of the phosphor particles at minimum is preferable, more preferable is a thickness corresponding to twenty layers of the phosphor particles. When exceeding the thickness corresponding to the twenty layered lamination of phosphor particles, the luminescent efficiency of the phosphor layers becomes saturated, and a sufficient size for the discharge space 122 cannot be secured.

Furthermore, in the case of phosphor particles obtained by a hydrothermal synthesis method or the like, the particle diameter thereof is sufficiently small and the particles are spherical. Therefore, as compared with the case using the particles that are not spherical, the filling density of the phosphor layer can be enhanced even from the same lamination number and a total surface area of the phosphor particles increases, thus increasing a surface area of the phosphor particles contributing to the actual luminescence in the phosphor layer and further enhancing the luminescent efficiency.

A method for synthesizing these phosphor layers 110R, 110G and 110B and a method for manufacturing blue phosphor particles used for a blue phosphor layer in which substitution with hexavalent ions (Mo, W) is conducted will be described later.

The thus manufactured front panel and rear panel are overlaid so that the respective electrodes on the front panel are orthogonal to the address electrodes on the rear panel, and a sealing glass is inserted therebetween along the edge of the panel. This is baked at about 450° C. for 10 to 20 minutes, for example, so as to form a hermetically sealed layer 121 (FIG. 1) for sealing. Then, after the discharge space 122 is first evacuated to high vacuum (e.g., $1.1 \times 10^{-4}$ Pa), the space is filled with a discharge gas (e.g., He—Xe based, Ne—Xe based inert gas) under a predetermined pressure so as to manufacture the PDP 100.

FIG. 5 schematically shows a configuration of an ink application apparatus 20 used for forming the phosphor layers 110R, 110G and 110B.

As shown in FIG. 5, the ink application apparatus 200 is provided with a supply container 210, a booster pump 220, a header 230 and the like. A pressure is applied by the booster pump 220 to a phosphor ink supplied from the supply container 210 containing the phosphor ink and is supplied to the header 230. The header 230 is provided with an ink space 230a and a nozzle 240, and the phosphor ink supplied to the ink space 230a under the pressure is dispensed continuously from the nozzle 240. Preferably, a diameter of the hole of this nozzle 240 is 30 μm or more so as to avoid the clogging of the nozzle and is not more than the interval W (about 130 μm to 200 μm) between the barrier ribs 109 for avoiding run-off beyond the barrier rib during the application. It generally is set at 30 μm to 130 μm.

The header 230 is configured so as to be linearly driven by a header scanning mechanism (not illustrated). While scanning the header 230, a phosphor ink 250 is dispensed continuously from the nozzle 240, whereby the phosphor ink can be applied uniformly into the groove between the barrier ribs 109 on the rear glass substrate 102. Herein, the viscosity of the phosphor ink used is kept in a range of 1500 to 30000 CP at 25° C.

The supply container 210 is provided with a stirrer (not illustrated) and the precipitation of the particles in the phosphor ink can be avoided by the stirring. The header 230 is molded integrally with the ink space 230a and the nozzle 240 and is manufactured by machinery processing or electrical discharge machining of a metal material.

The method for forming the phosphor layer is not limited to the above, and various methods are available including a photo lithography method, a screen printing method, a method for arranging a film in which phosphor particles are mixed and the like.

The phosphor ink is prepared by mixing phosphor particles of the respective colors, a binder and a solvent so as to have 1500 to 30000 centi-poise (CP). A surface-active agent, silica, a dispersing agent (0.1 to 5 wt %) and the like may be added thereto, as needed.

As red phosphor mixed in the phosphor ink, a compound represented by $(Y, Gd)_{1-x}BO_3:Eu_x$ or $Y_{2-x}O_3:Eu_x$ may be used. This is a compound in which a part of Y elements making up its matrix material is substituted with Eu. Herein, the substitution amount X of Eu elements with reference to Y elements preferably is within a range of $0.05 \leq X \leq 0.20$. When the substitution amount exceeds this range, although the brightness increases, deterioration in brightness becomes remarkable, and therefore it becomes difficult to use practically it, conceivably. On the other hand, when the substitution amount is below this range, the composition ratio of Eu as the luminescent center decreases, thus decreasing the brightness, and therefore the use as the phosphor becomes impossible.

As a green phosphor, a compound represented by $Zn_{2-x}SiO_4:Mn_x$ or $Y_{1-x}BO_3:Tb_x$ may be used. $Zn_{2-x}SiO_4:Mn_x$ is a compound in which a part of Zn elements making up its matrix material is substituted with Mn. $Y_{1-x}BO_3:Tb_x$ is a compound in which a part of Y elements making up its matrix material is substituted with Tb elements. Herein, the substitution amount X of Mn elements with reference to Zn elements preferably is within a range of $0.01 \leq X \leq 0.10$ for the same reasons described for the red phosphor. The substitution amount X of Tb elements with reference to Y elements preferably is within a range of $0.02 \leq X \leq 0.15$.

As a blue phosphor, a compound represented by $Ba_{1-x}MgAl_{10}O_{17}:Eu_x$ or $Ba_{1-x-y}Sr_yMgAl_{10}O_{17}:Eu_x$ (where $0.03 \leq X \leq 0.20$, $0.1 \leq Y \leq 0.5$) may be used. $Ba_{1-x}MgAl_{10}O_{17}:Eu_x$ or $Ba_{1-x-y}Sr_yMgAl_{10}O_{17}:Eu_x$ (where $0.03 \leq X \leq 0.20$, $0.1 \leq Y \leq 0.5$) is a compound in which a part of Ba elements making up its matrix material is substituted with Eu or Sr. The substitution amount of hexavalent element ions (Mo, W), with which Al, Mg and Ba element ions are substituted, preferably ranges from 0.001 mol % to 3 mol %.

As the binder mixed in the phosphor ink, ethylcellulose and acrylic resin may be used (mixed at 0.1 to 10 wt % of the ink), and as the solvent, α-terpinenol and butyl carbitol may be used. As the binder, a polymer such as polymethyl methacrylate (PMA) and polyvinyl acetate (PVA) and an organic solvent such as diethylene glycol and methyl ether may be used.

Furthermore, in the present embodiment, phosphor particles manufactured by a solid phase sintering method, an aqueous solution method and a spraying and baking method and a hydrothermal synthesis method may be used, which will be described below in detail.

(1) Blue Phosphor ($Ba_{1-x}MgAl_{10}O_{17}:Eu_x$)

Firstly, in a step of manufacturing a mixture solution, barium nitrate $Ba(NO_3)_2$, magnesium nitrate $Mg(NO_3)_2$, aluminum nitrate $Al(NO_3)_3$ and europium nitrate $Eu(NO_3)_2$ as raw materials are mixed so as to have a molar ratio of $1-X:1:10:X (0.03 \leq X \leq 0.20)$. This is dissolved in an aqueous medium so as to manufacture a mixture solution. As this aqueous medium, ion-exchanged water and pure water are preferable because they do not contain impurities, but they may contain a non-aqueous medium (methanol and ethanol).

As raw materials for substituting Mg, Al and Ba with hexavalent ions (Mo, W), nitrates, chlorides and organic compounds of the above hexavalent ions (Mo, W) may be used. The substitution amount of the hexavalent element ions (Mo, W) with which Al, Mg and Ba element ions are substituted preferably is within a range of 0.001 mol % to 3 mol %.

Next, the hydrate mixture solution is poured into a container having corrosion and heat resistance, made of gold or platinum, for example, which is then subjected to hydrothermal synthesis (for 12 to 20 hours) in a high pressure container at a predetermined temperature (100 to 300° C.) and under a predetermined pressure (0.2 MPa to 10 MPa) using an apparatus such as an autoclave enabling the application of heat and pressure.

Next, the resulting powder is baked at a predetermined temperature and for a predetermined time period, e.g., at 1350° C. for 2 hours in a reducing atmosphere containing 5% of hydrogen and 95% of nitrogen, for example. Thereafter, this is screened out, whereby desired blue phosphor $Ba_{1-x}MgAl_{10}O_{17}:Eu_x$ in which a part of Mg, Al and Ba is substituted with hexavalent ions (Mo, W) can be obtained. Moreover, in order to enhance the resistance to vacuum ultraviolet light (VUV), the above phosphor is baked in an oxidizing atmosphere (preferably, 700° C. to 1000° C.).

The phosphor particles obtained by conducting the hydrothermal synthesis have a spherical shape, whose average particle diameter becomes about 0.05 μm to 2.0 μm. A smaller particle diameter can be formed as compared with the conventional particles manufactured by solid phase reaction. Note here that the "spherical" in this context is defined in a manner that the aspect ratio (diameter in minor axis/diameter in major axis) ranges from 0.9 to 1.0, inclusive. However, all of the phosphor particles are not necessarily within this range. In other words, various particle shapes may be included.

Furthermore, without putting the above hydrate mixture solution in the container made of gold or platinum, the blue phosphor can be manufactured by a spraying method in which this hydrate mixture solution is sprayed into a high temperature oven from a nozzle so as to synthesize the phosphor.

(2) Blue Phosphor ($Ba_{1-x-y}Sr_yMgAl_{10}O_{17}:Eu_x$)

This phosphor (x and y are the same as above) is different from the afore-mentioned $Ba_{1-x}MgAl_{10}O_{17}:Eu_x$ only in the raw materials, and is manufactured by a solid phase reaction method. The following describes the raw materials used.

As the raw materials, barium hydroxide $Ba(OH)_2$, strontium hydroxide $Sr(OH)_2$, magnesium hydroxide $Mg(OH)_2$, aluminum hydroxide $Al(OH)_3$ and europium hydroxide $Eu(OH)_2$ are weighed to have a required molar ratio and then oxides and hydroxides of hexavalent ions (Mo, W) with which Mg, Al and Ba are substituted are weighed so as to have a required ratio. These are mixed with $AlF_3$ as a flux, followed by baking at a predetermined temperature (1300° C. to 1400° C.) for 12 to 20 hours, whereby $Ba_{1-x-y}Sr_yMgAl_{10}O_{17}:Eu_x$ in which Mg and Al have been substituted with hexavalent ions (Mo, W) can be obtained. The average particle diameter of the phosphor particles obtained by this method is about 0.1 μm to 3.0 μm.

Next, this is baked at a predetermined temperature (1000° C. to 1600° C.) for 2 hours in a reducing atmosphere of 5% of hydrogen and 95% of nitrogen, for example, and then is screened out by an air classifier so as to form phosphor powder. As the raw materials of the phosphor, oxides, nitrates and hydroxides mainly are used. However, organic metal compounds containing elements such as Ba, Sr, Mg, Al, Eu, Mo and W, e.g., metal alkoxide and acetylacetone may be used so as to manufacture the phosphor. Moreover, by annealing the afore-mentioned reduced phosphor in an oxidizing atmosphere, a phosphor with reduced deterioration due to vacuum ultraviolet light (VUV) can be obtained.

(3) Green Phosphor ($Zn_{2-x}SiO_4:Mn_x$)

Firstly, in a step of manufacturing a mixture solution, zinc nitrate $Zn(NO_3)_2$, silicon nitrate $Si(NO_3)_2$ and manganese nitrate $Mn(NO_3)_2$ as raw materials are mixed so as to have a molar ratio of 2-X:1:X($0.01 \leq X \leq 0.10$). Thereafter, this mixture solution is sprayed from a nozzle into an oven heated at 1500° C. while applying ultrasonic wave thereto, whereby the green phosphor is manufactured.

(4) Green Phosphor ($Y_{1-x}BO_3:Tb_x$)

Firstly, in a step of manufacturing a mixture solution, yttrium nitrate $Y_2(NO_3)_3$, boric acid $H_3BO_3$ and terbium nitrate $Tb(NO_3)_3$ as raw materials are mixed so as to have a molar ratio of 1-X:1:X($0.01 \leq X \leq 0.10$). This is dissolved in ion-exchanged water so as to manufacture the mixture solution.

Next, in a step of hydration, a basic water solution (e.g., ammonia water solution) is dropped into this mixture solution, whereby a hydrate is formed. Thereafter, in a step of hydrothermal synthesis, this hydrate and ion-exchanged water are poured into a capsule having the corrosion resistance and the heat resistance, made of gold or platinum, for example, which is then subjected to hydrothermal synthesis (for 2 to 20 hours) in a high pressure container at a predetermined temperature (100 to 300° C.) and under a predetermined pressure (0.2 MPa to 10 MPa) using an apparatus such as an autoclave.

Thereafter, this is dried, so that a desired $Y_{1-x}BO_3:Tb_x$ can be obtained. With this hydrothermal synthesis step, the obtained phosphor has a particle diameter of about 0.1 μm to 2.0 μm and has a spherical shape.

Next, this powder is annealed in the air at 800° C. to 1100° C., followed by screening out, thus obtaining the green phosphor.

(5) Red Phosphor (($Y, Gd)_{1-x}BO_3:Eu_x$)

In a step of manufacturing a mixture solution, yttrium nitrate $Y_2(NO_3)_3$, gadolinium nitrate $Gd_2(NO_3)_3$, boric acid $H_3BO_3$ and europium nitrate $Eu_2(NO_3)_3$ as raw materials are mixed so as to have a molar ratio of 1-X:2:X ($0.05 \leq X \leq 0.20$) and a ratio between Y and Gd of 65:35. Next, this is heat-treated in the air at 1200° C. to 1350° C. for 2 hours, followed by screening out, thus obtaining the red phosphor.

(6) Red Phosphor ($Y_{2-x}O_3:Eu_x$)

In a step of manufacturing a mixture solution, yttrium nitrate $Y_2(NO_3)_2$ and europium nitrate $Eu(NO_3)_2$ as raw materials are mixed, which is dissolved in ion-exchanged water so as to have a molar ratio of 2-X:X ($0.05 \leq X \leq 0.30$), thus manufacturing a mixture solution. Next, in a step of hydration, a basic water solution, e.g., ammonia water solution, is dropped into this water solution, whereby a hydrate is formed.

Thereafter, in a step of hydrothermal synthesis, this hydrate and ion-exchanged water is poured into a container having the corrosion resistance and the heat resistance, made of gold or platinum, for example, which is then subjected to hydrothermal synthesis (for 3 to 12 hours) in a high pressure container at a temperature of 100 to 300° C. and under a pressure of 0.2 MPa to 10 MPa using an apparatus such as an autoclave. Thereafter, the thus obtained compound is dried, so that a desired $Y_{2-x}O_3:Eu_x$ can be obtained. Next, this phosphor is annealed in the air at 1300° C. to 1400° C. for 2 hours, followed by screening out, thus obtaining the red phosphor. With this hydrothermal synthesis step, the obtained phosphor has a particle diameter of about 0.1 μm to 2.0 μm and has a spherical shape. This particle diameter and the shape are suitable for the formation of a phosphor layer with excellent luminescent characteristics.

Then, in order to evaluate the performances of the plasma display device of the present invention, samples were manufactured in accordance with the above embodiment, and performance evaluation examinations were conducted for these samples. The experimental results will be described below.

The manufactured respective plasma display devices were 42 inch in size (rib pitch of 150 μm required by HD-TVs), where the thickness of the dielectric glass layer was 20 μm, the thickness of the MgO protective layer was 0.5 μm.and the distance between the display electrodes and the display scanning electrodes was 0.08 mm. A discharge gas with which the discharge space was filled was a mixed gas of neon as a main gas with 7 vol % xenon gas mixed thereto, the discharge gas being filled at a predetermined discharge gas pressure.

For the respective blue phosphor particles used in the plasma display devices of samples 1 to 10, phosphors were used in which Mg, Al and Ba ions making up the phosphors are substituted with hexavalent ions. Tables 2 to 3 show the respective conditions for synthesis.

TABLE 2

| Sample No. | Amount of Eu x, y | Manufacturing method | Amount of hexavalent elements with which Al, Mg and Ba are substituted |
|---|---|---|---|
| Blue phosphors ($Ba_{1-x}MgAl_{10}O_{17}:Eu_x$) | | | |
| 1 | x = 0.03 | Hydrothermal synthesis | W 0.05 |
| 2 | x = 0.05 | Solid phase reaction (flux method) | W 0.01 |
| 3 | x = 0.1 | Solid phase reaction (flux method) | Mo 0.03 |
| 4 | x = 0.2 | Water solution | Mo 3.0 |
| Blue phosphors ($Ba_{1-x-y}Sr_yMgAl_{10}O_{17}:Eu_x$) | | | |
| 5 | x = 0.03, y = 0.1 | Solid phase reaction (flux method) | W 1.0 |
| 6 | x = 0.1, y = 0.3 | Hydrothermal synthesis | W 0.001 |
| 7 | x = 0.03, y = 0.1 | Spraying | Mo 0.02 |
| 8 | x = 0.1, y = 0.5 | Solid phase reaction | Mo 1.0 |
| 9 | x = 0.2, y = 0.3 | Solid phase reaction | Mo 1.0, W 0.5 |

TABLE 2-continued

| Sample No. | Amount of Eu x, y | Manufacturing method | Amount of hexavalent elements with which Al, Mg and Ba are substituted |
|---|---|---|---|
| 10 | x = 0.1, y = 0.5 | Solid phase reaction | Mo 0.1, W 0.05 |
| *11 | x = 0.1, y = 0.5 | Solid phase reaction | None |

(Remark) *11 shows comparative example.

TABLE 3

| Sample No. | Amount of Eu, x | Manufacturing methods | Amount of Mn, x | Manufacturing methods |
|---|---|---|---|---|
| | Red phosphors $((Y, Gd)_{1-x}BO_3:Eu_x)$ | | Green phosphors $(Zn_{2-x}SiO_4:Mn_x)$ | |
| 1 | X = 0.1 | Solid phase reaction | X = 0.01 | Spraying |
| 2 | X = 0.2 | Spraying | X = 0.02 | Hydrothermal synthesis |
| 3 | X = 0.3 | Water solution | X = 0.05 | Solid phase reaction |
| 4 | x = 0.15 | Hydrothermal synthesis | X = 0.1 | Solid phase reaction |
| | Red phosphors $(Y_{2-x}O_3:Eu_x)$ | | Green phosphors (mixture of $(Zn_{2-x}SiO_4:Mn_x)$ and $(Y_{1-x}BO_3:Tb_x)$, ratio 1:1) | |
| 5 | x = 0.01 | Hydrothermal synthesis | X = 0.01 | Hydrothermal synthesis |
| 6 | x = 0.1 | Spraying | X = 0.02 | Spraying |
| 7 | x = 0.15 | Water solution | X = 0.05 | Solid phase reaction |
| 8 | x = 0.2 | Solid phase reaction | X = 0.1 | Solid phase reaction |
| 9 | x = 0.2 | Solid phase reaction | X = 0.1 | Solid phase reaction |
| 10 | x = 0.15 | Water solution | X = 0.01 | Solid phase reaction |
| *11 | x = 0.15 | Water solution | $Zn_2SiO_4$:Mn only x = 0.05 | Solid phase reaction |

(Remark) *11 shows comparative example.

Samples 1 to 4 included the combination of $(Y, Gd)_{1-x}BO_3:Eu_x$ used as the red phosphors, $Zn_{2-x}SiO_4:Mn_x$ used as the green phosphors and $Ba_{1-x}MgAl_{10}O_{17}:Eu_x$ used as the blue phosphors. The methods for synthesizing the phosphors, the substitution ratios of Eu and Mn functioning as luminescent center, i.e., the substitution ratios of Eu elements with reference to Y, Ba elements and the substitution ratios of Mn with reference to Zn elements and the types and the amounts of hexavalent ions (elements) with which Mg, Al and Ba are substituted were changed as shown in Tables 2 to 3.

Samples 5 to 10 included the combination of $Y_{2-x}O_3:Eu_x$ used as the red phosphors, the mixture of $Zn_{2-x}SiO_4:Mn_x$ and $Y_{1-x}BO_3:Tb_x$ used as the green phosphors and $Ba_{1-x-y}Sr_yMgAl_{10}O_{17}:Eu_x$ used as the blue phosphors. Similarly to the above, the conditions for the methods of synthesizing the phosphors and the substitution ratios of the luminescent center and the types and the amounts of hexavalent ions (elements) with which Mg, Al and Ba making up the blue phosphors are substituted were changed as shown in Tables 2 to 3.

Furthermore, the phosphor inks used for the formation of the phosphor layers were manufactured by using the respective phosphor particles shown in Tables 2 to 3 and mixing the phosphors, a resin, a solvent and a dispersing agent. The viscosity of the phosphor inks in this step (25° C.) could be kept within a range of 1500 CP and 30000 CP in all samples. When observing the thus formed phosphor layers, the phosphor inks were applied uniformly on the walls of the barrier ribs in all samples. Furthermore, in the respective samples, the phosphor particles used for the phosphor layers in the respective colors had the average particle diameter of 0.1 μm to 3.0 μm and the maximum particle diameter of 8 μm or less.

The comparative sample 11 used the conventional phosphor particles in which no special treatment had been conducted for the phosphor particles in the respective colors.

(Experiment 1)

As for the thus manufactured samples 1 to 10 and the comparative sample 11, the brightness for the respective colors after the phosphor baking step (520° C., 20 min.) in the rear panel manufacturing process was measured. Then, after the panel bonding step (sealing step at 450° C. for 20 min.) in the panel manufacturing process, the rates of change (deterioration) in the brightness for the respective phosphors were measured.

(Experiment 2)

The brightness of the illumination states of a panel for the respective colors and the rates of change (deterioration) in the brightness were measured as follows: discharge sustaining pulses with a voltage of 180 V and a frequency of 100 kHz were applied to a plasma display device continuously for 1000 hours (life test) and the panel brightness before and after the test was measured. From the measurement results, the rate of change (deterioration) in brightness ([{brightness after the test−brightness before the test}/brightness before the test]×100) was determined. Address errors during the address discharge were judged from the observation of an image so as to check flickering. When flickering occurred even at one point, this was judged as an error. Furthermore, the brightness distribution, uneven color and shift in color of the panel were determined by measuring the brightness of a white image by a luminance meter and were judged from the overall distribution and by visual inspection.

Table 4 shows the results of the brightness, the rate of change (deterioration) in brightness for the respective colors and the visual inspection of the address errors and uneven color for Experiments 1 and 2.

(Experiment 3)

The phosphors in all colors were recovered from samples 1 to 10 and comparative sample 11, and the amounts of the adsorbed gas of these phosphors were measured using a TDS analyzer (thermal desorption spectrometry apparatus), where outgassing amounts of water, $CO_2$ and hydrocarbon gas at 100° C. to 600° C. were measured. Next, assuming that the total outgassing amount of water, $CO_2$ and hydrocarbon gas (mass number 40 or more) of sample 1 was 1, the relative amounts of samples 2 to 10 and the comparative sample 11 were measured so as to measure the relative values of the gas amounts contained in the phosphors. Table 4 shows these results also.

TABLE 4

| Sample No. | Brightness of phosphors Rate of deterioration[1] (%) | | | Rate of change in brightness[2] (%) | | | Presence of address errors during address discharge | Uneven color and shift in color during illumination state of white full display | Relative ratio of adsorbate[3] |
|---|---|---|---|---|---|---|---|---|---|
| | Blue | Red | Green | Blue | Red | Green | | | |
| 1 | −0.8 | −1.2 | −3.0 | −0.7 | −1.0 | −2.8 | No | No | 1 |
| 2 | −0.5 | −1.2 | −3.1 | −0.5 | −0.9 | −2.5 | No | No | 0.9 |
| 3 | −1.5 | −1.3 | −3.5 | −1.0 | −1.1 | −2.9 | No | No | 1.5 |
| 4 | −1.0 | −1.4 | −3.9 | −0.8 | −0.8 | −2.7 | No | No | 1 |
| 5 | −1.2 | −1.5 | −3.6 | −1.1 | −1.0 | −2.5 | No | No | 0.8 |
| 6 | −1.1 | −1.3 | −3.3 | −0.9 | −0.8 | −2.1 | No | No | 0.7 |
| 7 | −1.5 | −1.4 | −3.8 | −1.2 | −1.2 | −2.8 | No | No | 1.1 |
| 8 | −0.8 | −1.3 | −3.5 | −0.4 | −0.6 | −2.9 | No | No | 1.4 |
| 9 | −0.8 | −1.2 | −2.8 | −0.3 | −0.6 | −1.8 | No | No | 0.6 |
| 10 | −0.6 | −1.1 | −2.9 | −0.2 | −0.5 | −1.9 | No | No | 0.7 |
| *11[4] | −21.5 | −2.1 | −13.2 | −20.5 | −1.8 | −10.3 | Yes | Yes | 10.5 |

(Remark [1])Rates of deterioration in brightness (%) of phosphors after the sealing step (450° C.) in the panel bonding process with reference to the brightness after the phosphor baking process are shown.
(Remark [2])Rates of change in brightness (%) of the panels after the application of discharge sustaining pulses at 180 V and 100 kHz for 1000 hours are shown.
(Remark [3])The total amounts of water, $CO_2$ and hydrocarbon gas adsorbed to the phosphors in the panels are represented by relative ratios assuming that the total amount of sample 1 was 1.
(Remark [4])*11 shows comparative example.

As shown in Table 4, sample 11, in which the substitution treatment with ions had not been conducted on the blue phosphor, showed significant deterioration in brightness during the respective steps, in particular, in blue and green brightness. As for blue, a reduction in brightness of 21.5% occurred during the sealing step after the phosphor baking step and a reduction in brightness of 20.5% occurred during the life test at 180 V and 100 kHz. As for green, a reduction in brightness of 13.2% occurred during the panel bonding step and a reduction in brightness of 10.3% occurred during the life test at 180 V and 100 kHz. In accordance with these changes in brightness, the degree of uneven color and shift in color also increased. On the other hand, in all of samples 1 to 10, the rate of change for blue was 2% or less after the panel bonding step and the life test, and that for green also was 4% or less. Moreover, they were free from address errors, uneven color and shift in color of the panels.

This results from the substitution of Mg, Al and Ba ions (elements) making up the blue phosphor with hexavalent ions (elements), which allows a significant decrease in oxygen defects in the blue phosphor (especially, oxygen defects in the vicinity of Ba—O). Therefore, water, $CO_2$ and hydrocarbon gas and the like that are discharged from this blue phosphor are decreased considerably, and the amount of outgassing from the blue phosphor during the panel sealing process can be reduced, which can exert favorable effects not only on the blue itself but also on the adjacent green and red phosphors and MgO. Especially, samples 4, 6 and 8 whose blue phosphors were annealed in an oxidizing atmosphere had reduced rates of change in brightness after the discharge sustaining pulse test at 180 V and 100 kHz because oxygen defects thereof could be reduced.

Furthermore, as shown in Tables 2 to 3, it was found that the impurity gas amounts of the phosphors of the panels in samples 1 to 10 using the blue phosphors whose Mg, Al and Ba were substituted with hexavalent ions were smaller than those of comparative example 11. Conceivably, such a reduced amount of impurity gas contributes to less deterioration in brightness for blue and green. Therefore, with the panel using blue phosphor whose Mg, Al and Ba are substituted with hexavalent ions, address errors, uneven color and shift in color can be alleviated.

The conventional blue phosphors had an increased degree of deterioration during the respective steps as compared with the blue phosphor of the present invention and tended to decrease in color temperature of white when light in three colors was emitted concurrently. To cope with this, the color temperature of a white image in the conventional plasma display device has been corrected by decreasing the brightness of the cell for phosphors other than blue (i.e., red and green phosphors) by means of a circuit. However, the use of the phosphor particles including blue phosphor in which a part of Mg, Al and Ba ions constituting the blue phosphor is substituted with hexavalent ions allows the brightness of blue to be enhanced. Furthermore, such phosphor particles can reduce deterioration during the panel manufacturing process and deterioration in green also can be reduced. Therefore, there is no need to decrease the brightness of cells in other colors intentionally, which means that there is no need to decrease the brightness of cells in all colors intentionally. Therefore, the brightness of the cells in all colors can be utilized fully, so that the brightness of the plasma display device can be increased while keeping a high color temperature state for a white image.

Note here that the above blue phosphor can be applied to a fluorescent lamp that emits light by exciting with the same ultraviolet rays. In such a case, the conventional blue phosphor particles applied on an inner wall of the fluorescent lamp may be replaced by a phosphor layer including blue phosphor in which Mg, Al and Ba ions making up the blue phosphor particles are substituted with hexavalent ions (W, Mo). In this way, when the above blue phosphor is applied to a fluorescent lamp and a backlight for liquid crystal displays, higher brightness and reduced deterioration in brightness can be realized as compared with the conventional one.

The invention may be embodied in other forms without departing from the spirit or essential characteristics thereof.

The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A plasma display device, comprising a plasma display panel in which a plurality of discharge cells in one color or in a plurality of colors are arranged and phosphor layers are arranged so as to correspond to the discharge cells in colors and in which light is emitted by exciting the phosphor layers with ultraviolet rays,
    wherein the phosphor layers comprise blue phosphor, the blue phosphor being composed of an alkaline-earth metal aluminate phosphor containing at least one element selected from the group consisting of Mo and W,
    wherein the blue phosphor comprises particles, and
    a concentration of at least one element selected from the group consisting of Mo and W in the vicinity of a surface of the particles is higher than an average concentration of the element in the phosphor particles as a whole.

2. The plasma display device according to claim 1, wherein the alkaline-earth metal aluminate phosphor is a blue phosphor having a crystal structure of $Ba_{1-x}MgAl_{10}O_{17}$:$Eu_x$ or $Ba_{1-x-y}Sr_yMgAl_{10}O_{17}$:$Eu_x$ (where $0.03 \leq X \leq 0.20$, $0.1 \leq Y \leq 0.5$).

3. The plasma display device according to claim 1, wherein an average content of at least one element selected from the group consisting of Mo and W in the blue phosphor is within a range of 0.001 to 3.0 mol %.

4. The plasma display device according to claim 1,
    wherein the concentration of at least one element selected from the group consisting of Mo and W in the vicinity of the surface of the particles is twice or higher than the average concentration of the element in the phosphor particles as a whole.

5. The plasma display device according to claim 4,
    wherein the concentration of at least one element selected from the group consisting of Mo and W in the vicinity of the surface of the particles is three times or higher than the average concentration of the element in the phosphor particles as a whole.

6. The plasma display device according to claim 1, wherein the concentration of at least one element selected from the group consisting of Mo and W in the vicinity of the surface of the particles ranges from 0.30 to 9.00 mol %.

7. The plasma display device according to claim 1, wherein the vicinity of the surface of the phosphor particles is a range of 50 nm or less from the surface of the phosphor particles.

8. The plasma display device according to claim 7, wherein the vicinity of the surface of the phosphor particles is an average value in a region of 10 nm or less from the surface of the phosphor particles.

9. The plasma display device according to claim 1, wherein an average particle diameter of the phosphor particles is within a range of 0.05 μm to 3.0 μm, inclusive.

10. The plasma display device according to claim 9, wherein the average particle diameter of the phosphor particles is within a range of 0.1 μm to 2.0 μm, inclusive.

11. The plasma display device according to claim 9, wherein the phosphor particles have a particle size distribution such that a maximum particle diameter is four times or less the average particle diameter and a minimum particle diameter is one fourth or more the average particle diameter.

12. The plasma display device according to claim 1, wherein the phosphor layers are formed by mixing phosphor particles with a binder so as to make a paste and by applying the paste onto a surface of the discharge cells, followed by baking.

13. The plasma display device according to claim 1, wherein a thickness of the phosphor layers is within a range of 8 times to 25 times an average particle diameter of phosphor particles, inclusive.

14. The plasma display device according to claim 1,
    wherein the blue phosphor particles comprise an alkaline-earth metal aluminate phosphor containing tungsten (W), and
    a concentration of tungsten (W) in the vicinity of a surface of the phosphor particles is higher than an average concentration of tungsten (W) in the phosphor particles as a whole.

15. The plasma display device according to claim 14,
    wherein the alkaline-earth metal aluminate comprises an alkaline-earth metal aluminate represented by a general formula of $xBaO \cdot (1-x)SrO \cdot zMgO \cdot 5Al_2O_3$ ($0.60 \leq x \leq 1.00$, $1.00 \leq z \leq 1.05$), and
    0.40 to 1.70 mol % of Eu in terms of Eu and 0.04 to 0.80 mol % of W in terms of W are included with reference to the alkaline-earth metal aluminate.

16. The plasma display device according to claim 14, wherein a concentration of W in the vicinity of the surface of the phosphor particles ranges from 0.30 to 9.00 mol %.

17. The plasma display device according to claim 14,
    wherein a concentration of Eu in the vicinity of the surface of the phosphor particles is higher than an average concentration of Eu in the phosphor particles as a whole, and
    a divalent Eu ratio (a ratio of divalent Eu elements to all of the Eu elements) in the vicinity of the surface of the phosphor particles is lower than an average divalent Eu ratio in the phosphor particles as a whole.

18. The plasma display device according to claim 17,
    wherein the divalent Eu ratio in the vicinity of the surface of the phosphor particles ranges from 5 to 50 mol %, and
    the average divalent Eu ratio in the phosphor particles as a whole ranges from 60 to 95 mol %.

19. The plasma display device according to claim 17,
    wherein the divalent Eu ratio in the vicinity of the surface of the phosphor particles ranges from 5 to 15 mol %, and
    the average divalent Eu ratio in the phosphor particles as a whole ranges from 60 to 80 mol %.

* * * * *